United States Patent Office 2,968,526
Patented Jan. 17, 1961

2,968,526
MANUFACTURE OF ANHYDROUS LITHIUM HALIDE BY DIRECT HALOGENATION OF LITHIUM HYDROXIDE

Ralph G. Verdieck, Havertown, and Justo B. Bravo, Malvern, Pa., assignors to Foote Mineral Company, Berwyn, Pa., a corporation of Pennsylvania
No Drawing. Filed Apr. 17, 1958, Ser. No. 729,078
12 Claims. (Cl. 23—89)

This invention relates to lithium halides, and more particularly provides a novel method for the manufacture of anhydrous lithium chloride and lithium bromide from lithium hydroxide.

Anhydrous lithium chloride is presently an article of commerce. Lithium bromide, which would generally be manufactured in a similar manner, is of present interest for certain applications for which the chloride is not an equivalent.

Past commercial practice in producing anhydrous lithium chloride has been to neutralize lithium hydroxide or lithium carbonate with hydrogen chloride in aqueous solution. This produces a solution of lithium chloride from which the water must subsequently be evaporated to produce an anhydrous product. The described procedure is obviously wastefully circuitous in that, to accomplish the conversion, reactants which are or may be anhydrous initially are diluted with large volumes of water, greatly increasing the bulk of material to be handled, and then all of the added water must in turn be removed from the product to yield the desired anhydrous material. To complete the dehydration, once the bulk of the water has been taken off, the product is then either fused in air or evaporated under vacuum. This ultimate dehydration must be carried out at relatively low temperatures, because of the tendency of lithium chloride to hydrolyze in the presence of water at elevated temperatures, with loss of HCl and concurrent formation of free alkali. Not only is the stated drying process tedious and a costly burden on the manufacturing economics, but additionally the operation ordinarily must be followed by subjecting the product to a grinding step, to reduce it to a free-flowing granular product. Accordingly, because of these several individual manufacturing steps which are required, the cost of anhydrous lithium chloride is disproportionately high as compared to the price of the chemicals which go into its manufacture.

In regard to the raw materials from which lithium chloride is manufactured, since chlorine generally is a more economical reagent than hydrochloric acid, it would appear obvious that the halogen should be used instead of the acid. However, if an alkali metal or alkaline earth metal hydroxide or carbonate is chlorinated in aqueous solution or in an aqueous slurry, the resulting product is a mixture, comprising the chloride admixed with oxidizing agents including the alkaline metal hypochlorite, chlorite, chlorate and perchlorate, in a ratio depending on the conditions of chlorination. Generally similar results are produced when bromine is employed. Thus, because of the difficulty or impossibility of obtaining a pure product, the substitution of the halogen for the hydrogen halide under aqueous conditions is precluded.

Insofar as direct reaction is concerned, the treatment of solid sodium hydroxide with chlorine, which has been studied under a variety of conditions, has been found inevitably to produce a mixture of hypochlorite, chlorate and chloride. Increasing temperature favors formation of chlorate, in highly stable form, containing perchlorate. It is true that the alkali chlorate can be reduced to the chloride, by heating to high temperatures, usually 400° C. or higher. This procedure is in fact a laboratory method for preparing pure oxygen; but it is not feasible to purify chloride-chlorate mixtures by such heating on a manufacturing scale, since the cost would be prohibitively high, and it would offer no economic advantage over the usual synthetic techniques. Again, substantially similar results are obtained with bromine, reaction with sodium hydroxide in aqueous solution producing oxybromides concurrently with the bromide. Accordingly, it has not hitherto been considered that halogenation of an alkali metal hydroxide had any commercial possibilities as an alkali metal halide synthesis method.

It is an object of this invention to provide an improved method for the manufacture of a lithium halide selected from the class consisting of lithium chloride and lithium bromide.

A particular object of this invention is to provide a process for the manufacture of an anhydrous lithium halide selected from the class consisting of lithium chloride and lithium bromide, by the direct reaction of lithium hydroxide with a halogen selected from the class consisting of chlorine and bromine, under conditions such that said lithium halide is substantially free of oxyhalides or other oxidizing materials.

Another object of this invention is to provide a direct one-step process for the manufacture of anhydrous lithium chloride and lithium bromide in the form of free-flowing granular products of relatively uniform particle size distribution.

Another object is to provide a process for the manufacture of anhydrous lithium chloride and lithium bromide which eliminates the necessity for any grinding step.

A further object is to provide a method for the manufacture of lithium chloride and lithium bromide under anhydrous conditions.

A further object of this invention is to provide a process for the manufacture of anhydrous lithium chloride substantially free of chlorates or other oxidizing materials by the direct reaction of chlorine with lithium hydroxide.

Another object is to provide a method for the manufacture of anhydrous lithium chloride in which manufacturing costs are reduced by substitution of chlorine for the more costly hydrogen chloride.

These and other objects will become apparent from the consideration of the following specification and claims.

It has now been found that direct chlorination or direct bromination of lithium hydroxide at a temperature above about 150° C. and below the melting point of the reaction mixture produces the corresponding anhydrous lithium halide substantially free of oxyhalides and free alkali, and in granular, free-flowing form.

The freedom from oxyhalides of the anhydrous lithium halides produced by the present process is highly surprising. As noted above, the reaction of halogens such as chlorine and bromine with sodium hydroxide is well known and has been studied at a variety of temperatures. Though the conditions of reaction are varied, the product consistently comprises a mixture of the halide with oxygen-containing, oxidizing materials such as the hypochlorite, chlorate, bromate, and so forth. The regular appearance of these oxyhalides may be traced to the fact that the reaction of a halogen with an alkali metal hydroxide produces oxygen as a byproduct of the halide synthesis. This may be represented by the equation for reaction of sodium hydroxide with chlorine:

$$2NaOH + Cl_2 \rightarrow 2NaCl + HOH + [O]$$

Nascent or atomic oxygen, oxygen formed as a product in the course of a reaction, is a potent oxidizing agent and accordingly induces the formation of hypohalite and higher oxidation products.

Unexpectedly, it has been found that when lithium hydroxide is subjected to reaction with chlorine or bromine under anhydrous conditions, within the above-stated temperature range, the halide produced is substantially free of oxidation products. In view of the general parallelism between reactions of analogous compounds of the alkali metals, this difference in reaction is surprising. It is particularly unexpected in view of the fact that lithium hydroxide appears to follows the same course of reaction with these halogens as sodium hydroxide insofar as the above-indicated reaction is concerned, oxygen being formed during the reaction and appearing in the effluent from the reaction zone. In spite of the liberation of this active, nascent oxygen in the reaction system, however, a reaction product free of oxidized compounds is surprisingly obtained. A particularly unexpected aspect of these results is that this freedom from oxidation products is attained by operating within the elevated temperature range set forth above. While it is generally to be expected that increasing temperature will promote oxidation, in the present lithium hydroxide halogen system, un- obviously, at lower temperatures, oxidation products appear, whereas raising the temperature to the preferred temperature range of this invention obviates the occurrence of the oxyhalides.

The present discovery represents a significant advance in the art of the manufacture of anhydrous lithium halides, particularly anhydrous lithium chloride. The substitution of chlorine for the more costly hydrogen chloride without sacrifice in the purity of the product makes possible important economic savings. Moreover, not only is the reageant cost diminished, but furthermore, the number of separate steps required to produce the anhydrous product is hereby reduced to the minimum. It eliminates entirely the prior procedure requiring handling large volumes of water merely as a reaction medium, and without contributing any value to the product, only to remove all the aqueous medium again. A further advantage of the present lithium halide manufacturing process is that it results directly in the production of a free-flowing granular product of relatively uniform particle size distribution, and substantially dust-free. This product is of such a nature that it can be packaged immediately without further processing, and no grinding or pulverizing operation is necessary. In a single step, employing inexpensive reagents, the present process accomplishes the manufacture of a product of a quality equivalent for substantially every purpose to the commercial product available hitherto.

The lithium compound used in carrying out the process of the invention may be either anhydrous lithium hydroxide or lithium hydroxide monohydrate. When reference is made herein to lithium hydroxide, it is to be understood as referring either to the anhydrous or to the monohydrated compound unless specifically indicated otherwise. When lithium hydroxide monohydrate is employed, it will in fact be dehydrated to the hydroxide by the temperatures used in the reaction.

The conversion of the lithium hydroxide to substantially pure lithium halide is accomplished by contacting it with the appropriate halogen. For the purposes of this invention, the said halogen will be a halogen having an atomic weight of from 15 to 80. This atomic weight range includes bromine and chlorine, which halogens are effective to accomplish the purposes of this invention within the temperature range set forth herein.

The halogen will most preferably be in gaseous form when contacted with the lithium hydroxide. The gaseous halogen may be passed over a bed of the reactant, or to produce more intimate contact, the halogen may be passed through the hydroxide, either fixed in place, or if desired, suspended in the gaseous stream. The most advantageous embodiment of this invention will comprise passing substantially pure chlorine or bromine into contact with the lithium hydroxide, but if desired, inert diluents may be present in the gaseous halogen. The reaction consumes one mole of halogen for every two moles of lithium hydroxide, and the relative proportions of the reactants employed will be on this order. In a preferred embodiment of this invention, operating continuously, the halogen will be led into the reaction zone countercurrently to the direction of flow of the lithium hydroxide. In such embodiment, it has been found that substantially quantitative yields of the lithium halide can be produced with concomitant substantially complete consumption of the halogen introduced, by appropriate adjustment of the rate of flow of the reactants. This process accordingly offers considerable economies, by producing a stoichiometric overall material balance.

The temperature at which the present process is conducted will be between about 150° C. and a temperature below the melting point of the reaction mixture. Below about 150° C., the product contains chlorates or bromates, and is lumpy and hydrated. Accordingly the reaction mixture temperature should be at least about 150° C. During the halogenation, up to the time when more than half of the hydroxide has been converted to halide, the reaction mixture melting point, at least locally where unconverted hydroxide is in juxtaposition to the halide being produced, will be about 290° C. in the case of LiCl preparation, and about 275° C. in the case LiBr; and these respective temperatures must not be exceeded at this stage if a free-flowing, granular product is to be produced.

To obviate the formation of oxyhalides, at some time during the halogenation, the reaction mixture will be brought to a higher temperature than the stated minimum temperature. One embodiment of this invention will comprise maintaining the reaction mixture at a substantially constant temperature throughout the introduction of the halogen. In such case, the temperature at which the halogenation is conducted should be at least about 200° C. Whereas the LiCl product, although free-flowing and granular, contains about 8% lithium chlorate ($LiClO_3$) when the temperature is maintained at 150° C., at a constant temperature of 200° C., a lithium chloride product containing less than 1% $LiClO_3$ is obtained, and at 250° C., $LiClO_3$ is present, if at all, in traces. When bromine is introduced, generally parallel results are obtained. Accordingly, when the process of the invention is operated at constant temperature throughout, a temperature of from about 200° C. to about 270–280° C. is preferred.

As stated above, the temperature chosen should not exceed the melting point of the reaction mixture, and this upper temperature limit when the chlorination or bromination has been begun will be about 270–280° C. However, when the reaction has proceeded to a point where more than half of the lithium hydroxide has been converted to the halide, it will be possible to increase the operating temperature without exceeding the melting point of the reaction mixture. While the process of this invention may be conducted by maintaining the temperature of the reaction within the range set forth above, more rapid conversion is obtained by increasing the reaction temperature when this becomes possible while still conforming to the requirement of remaining below the reaction mixture melting point. Furthermore, when the reaction mixture temperature is so raised, lower temperatures than are otherwise preferred, in the range of 150–200° C., can be employed in the initial stage of the halogenation, without occurence of oxyhalides in the product. Thus greater flexibility in the operation of the process is attained, and the requirements for temperature control are less rigid.

Accordingly, it forms a preferred embodiment of this invention to raise the temperature of the reaction mixture in the course of the reaction, continuously or discontinuously, while maintaining the temperature of the reaction mixture below its melting point.

The point at which the temperature may be increased without detriment depends on the composition of the reaction mixture. This composition must be such that the eutectic composition of the mixture has been exceeded, and will be such that lithium hydroxide comprises less than 50 mole-percent of the reaction mixture. In the case of chlorination, the eutectic composition is 63 mole-percent LiCl/37 mole-percent LiOH. Accordingly, when above about 63 mole-percent, preferably about 80 mole-percent, of the LiOH has been converted to LiCl, the temperature of the reaction mixture can be raised to above 275–280° C., without danger of fusion of the mass. The maximum temperature which can be applied without producing fusion will thereafter gradually increase as the conversion proceeds, up to a temperature of just below about 613° C. when the reaction mixture is substantially entirely comprised of LiCl. When LiBr is to be produced, the reaction mixture temperature can be raised without producing fusion when the mixture comprises at least above about 55 mole-percent LiBr, and as the conversion of LiOH to LiBr proceeds, the temperature which can be applied without exceeding the melting point of the reaction mixture will increase to a maximum of about 550° C. when the formation of the LiBr is substantially complete. However, temperatures of these magnitudes, in the range of 550–610° C., are not generally required, and the process of the invention may advantageously be operated by raising the temperature as aforesaid, when the eutectic composition has been exceeded, to about 50–100° C. higher than the initial temperature of operation.

When conversion of the lithium hydroxide is complete, the pulverulent halide product is removed. It will be found that substantially complete conversion to lithium halide can be produced in relatively short times, and that the product will be lithium halide substantially free of oxidizing materials.

The invention is illustrated but not limited by the following examples:

Example I

This illustrates practice of the process of the invention to produce LiCl, employing a constant temperature during the halogenation.

In an initial preheating period, 6.39 parts by weight of lithium hydroxide monohydrate were heated to 200° C. and held at this temperature for one hour. Then chlorine was passed over the hydroxide at a rate of 0.08 part per minute until 5 parts by weight had been introduced. This required 64 minutes, during which time the reaction mixture was maintained at 200° C. The product was a white, free-flowing granular material, analyzing 94.9% LiCl, 0.9% $LiClO_3$ and 2.6% LiOH.

When the same procedure was followed but using 150° C., 6.3 parts of $LiOH.H_2O$, and 18.8 parts of $Cl_2$ introduced over a period of 75 minutes, the resulting product contained 8.5% $LiClO_3$.

Example II

This example illustrates the process of this invention conducted to produce LiCl, in the embodiment in which the temperature is raised during the course of the reaction.

In the initial preheating period of one hour, 3.6 parts by weight of granular lithium hydroxide monohydrate were heated to 150° C. and maintained at this temperature. Then a stream of chlorine gas was passed over the material until 18.8 parts by weight had been introduced. During the 75 minutes required for the introduction of this quantity of chlorine, the temperature of the reaction mixture was held at 150° C. for the first hour, and raised to 280° C. for the last 15 minutes. The product was a white, free-flowing granular material, analyzing 95.2% LiCl, and containing 0.25% $LiClO_3$ and 0.1% LiOH.

Examples III–XI

Using procedures as described in Examples I and II, employing the times, temperatures and quantities of materials shown in the following table, LiCl was produced substantially free of oxychlorides and in granular, free-flowing form.

In the table, $T_1$ is the temperature employed in the first period of chlorination, until the conversion of the LiOH to LiCl had proceeded beyond the eutectic composition in the reaction mixture, and $t_1$ is the time for which this reaction mixture temperature was maintained. $T_2$ is the temperature during the latter period of the halogenation, and $t_2$, the time for which this temperature was maintained. Where $T_1$ and $T_2$ are the same, $T_2$ and $t_2$ are omitted and $t_1$ is the total time of chlorination.

| Example | Preheating Temperature, ° C.[1] | Chlorination Temperature and Time | | | | Chlorine Rate (parts by weight per minute) | $LiOH.H_2O$ amount (parts by weight) | Product Analysis | | |
|---|---|---|---|---|---|---|---|---|---|---|
| | | $T_1$, ° C. | $t_1$, min. | $T_2$, ° C. | $t_2$, min. | | | LiCl | LiOH | $LiClO_3$ |
| III | 200 | 200 | 75 | | | 0.06 | 6.78 | 96.91 | 1.35 | 0.93 |
| IV | 150 | 250 | 50 | | | 0.21 | 10.24 | 96.29 | 0.44 | 0.05 |
| V | 150 | 250 | 28 | | | 0.21 | 6.11 | 97.35 | 1.12 | 0.00 |
| VI | 150 | 150 | 60 | 250 | 15 | 0.21 | 6.72 | 95.21 | 0.07 | 0.25 |
| VII | 200 | 200 | 90 | 280 | 40 | 0.10 | 6.5 | 99.84 | 0.30 | Traces |
| VIII | 200 | 200 | 150 | 300 | 60 | 0.10 | 6.72 | 98.59 | 0.34 | Traces |
| IX | 200 | 200 | 120 | 300 | 120 | 0.10 | 6.34 | 98.98 | 0.23 | Traces |
| X | 200 | 200 | 120 | 300 | 100 | 0.10 | 4.67 | 99.57 | 0.25 | Traces |
| XI | 200 | 200 | 200 | 300 | 90 | 1.6 | 174.8 | 99.70 | 0.06 | Traces |

[1] (1 hour from start of heating.)

Examples XII–XVIII

The bromination of lithium hydroxide was conducted by a procedure analogous to the chlorination procedure described in Examples I and II. Bromine was vaporized in an inert gas and passed over the heated lithium hydroxide, at constant temperature and while raising the temperature in the course of the reaction. The results are reported in the following table.

| Example | Preheating Temperature, ° C.[1] | Bromination Temperature and Time | | | | Bromine Rate (parts by weight per minute) | $LiOH.H_2O$ amount (parts by weight) | Product Analysis | | |
|---|---|---|---|---|---|---|---|---|---|---|
| | | $T_1$, ° C. | $t_1$, min. | $T_2$, ° C. | $t_2$, min. | | | LiBr | LiOH | $LiBrO_3$ |
| XII | 150 | 150 | 120 | | | [2] 0.10 | 5.75 | 46.8 | 33.8 | 11.7 |
| XIII | 200 | 200 | 90 | | | [2] 0.10 | 3.57 | 84.3 | 15.2 | 0.31 |
| XIV | 250 | 250 | 60 | | | [2] 0.10 | 2.99 | 97.6 | 1.7 | 0.27 |
| XV | 150 | 150 | 60 | 180 | 330 | 0.093 | 7.74 | 87.4 | 5.8 | 6.0 |
| XVI | 150 | 150 | 300 | 180 | 20 | [2] 0.05 | 2.00 | 82.2 | 8.7 | 7.9 |
| XVII | 150 | 150 | 150 | 200 | 250 | 0.075 | 4.44 | 91.6 | 8.3 | Trace |
| XVIII | 150 | 150 | 420 | 200 | 240 | 0.10 | 16.96 | 95.1 | 4.5 | Trace |

[1] (1 hour from start of heating.)
[2] Estimated.

What is claimed is:

1. Process for the production of an anhyrous lithium halide selected from the class consisting of lithium chloride and lithium bromide, said lithium halide being substantially free of oxyhalides, which comprises contacting lithium hydroxide with a halogen selected from the class consisting of chlorine and bromine at a temperature above about 150° C. and below the melting point of the reaction mixture, and maintaining said lithium hydroxde in contact with said halogen at said temperature until said lithium hydroxide has been substantially completely converted to lithium halide, said temperature being maintained at at least about 200° C. at least after the lithium halide content of the reaction mixture has exceeded the eutectic composition.

2. The process of claim 1 wherein the said process is conducted at a substantially constant temperature of between about 200° C. and the melting point of the reaction mixture.

3. The process of claim 1 wherein said temperature is raised in the course of said process.

4. Process for the direct production of anhydrous lithium chloride as a free-flowing, anhydrous granular product, said lithium chloride being substantially free of oxychlorides, which comprises contacting lithium hydroxide with chlorine at a temperature between about 150° C. and the melting point of the reaction mixture, and maintaining said lithium hydroxide in contact with said chlorine at said temperature until said lithium hydroxde has been substantially completely converted to lithium chloride, said temperature being maintained at at least about 200° C. at least after the lithium chloride content of the reaction mixture has exceeded the eutectic composition.

5. The process of claim 2 wherein said halogen is chlorine.

6. The process of claim 3 wherein said halogen is chlorine.

7. Process for the direct production of anhydrous lithium bromide as a free-flowing, anhydrous granular product, said lithium bromide being substantially free of oxybromides, which comprises contacting lithium hydroxide with bromine at a temperature between about 150° C. and the melting point of the reaction mixture, and maintaining said lithium hydroxide in contact with said bromine at said temperature until said lithium hydroxide has been substantially completely converted to lithium bromide, said temperature being maintained at at least about 200° C. at least after the lithium bromide content of the reaction mixture has exceeded the eutectic composition.

8. The process of claim 2 wherein said halogen is bromine.

9. The process of claim 3 wherein said halogen is bromine.

10. The process of claim 3 wherein said temperature is raised by about 50–100° C. when above about 50 mole-percent of said lithium hydroxide has been converted to said lithium halide.

11. Process for the production of anhydrous lithium chloride in granular, free-flowing form and substantially free of oxyhalides which comprises the steps of contacting lithium hydroxide with chlorine at an initial temperature of from at least about 150° C. to below the melting point of the reaction mixture, maintaining said lithium hydroxide in contact with said chlorine at said temperature until above about 25 mole-percent of said lithium hydroxide has been converted to lithium chloride, then raising said temperature and maintaining the reaction mixture at a temperature of about 50° to 100° C. above said initial temperature but below the melting point of the reaction mixture while continuing to contact said lithium hydroxide with chlorine until said lithium hydroxide has been substantially completely converted to lithium chloride.

12. Process for the production of anhydrous lithium bromide in granular, free-flowing form and substantially free of oxyhalides which comprises the steps of contacting lithium hydroxide with bromine at an initial temperature of from at least about 150° C. to below the melting point of the reaction mixture, maintaining said lithium hydroxide in contact with said bromine at said temperature until above about 55 mole-percent of said lithium hydroxide has been converted to lithium bromide, then raising said temperature and maintaining the reaction mixture at a temperature of about 50° to 100° C. above said initial temperature but below the melting point of the reaction mixture while continuing to contact said lithium hydroxide with bromine until said lithium hydroxide has been substantially completely converted to lithium bromide.

References Cited in the file of this patent

FOREIGN PATENTS 130,314    Switzerland _____ Feb. 1, 1929

OTHER REFERENCES

Gmelin-Kraut: "Handbuch der Anorganische Chemie," 8th ed., Teil 20 (Lithium) (1927), p. 114.

Liebig's "Annalen der Chemie," Bande 219–220 (1883), pp. 145–156.